United States Patent
Chun et al.

(10) Patent No.: US 8,498,646 B2
(45) Date of Patent: Jul. 30, 2013

(54) METHOD AND DEVICE FOR TRANSMITTING IWS IN A WIRELESS COMMUNICATION SYSTEM

(75) Inventors: Jin Young Chun, Anyang-si (KR); Sung Ho Park, Anyang-si (KR); Hyun Soo Ko, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 3 days.

(21) Appl. No.: 13/202,520

(22) PCT Filed: Feb. 22, 2010

(86) PCT No.: PCT/KR2010/001060
§ 371 (c)(1),
(2), (4) Date: Aug. 19, 2011

(87) PCT Pub. No.: WO2010/095896
PCT Pub. Date: Aug. 26, 2010

(65) Prior Publication Data
US 2011/0300870 A1    Dec. 8, 2011

Related U.S. Application Data

(60) Provisional application No. 61/154,421, filed on Feb. 22, 2009.

(30) Foreign Application Priority Data

Feb. 19, 2010   (KR) .......................... 10-2010-0015208

(51) Int. Cl.
*H04W 36/00*    (2009.01)

(52) U.S. Cl.
USPC ........................... 455/437; 455/436; 455/444

(58) Field of Classification Search
USPC ......................................... 455/437, 436, 444
See application file for complete search history.

(56) References Cited

U.S. PATENT DOCUMENTS

| | | | |
|---|---|---|---|
| 7,970,066 B1* | 6/2011 | Lee et al. | 375/260 |
| 2007/0097938 A1 | 5/2007 | Nylander et al. | |
| 2010/0003986 A1* | 1/2010 | Chen | 455/436 |
| 2010/0165942 A1* | 7/2010 | Liao et al. | 370/329 |

FOREIGN PATENT DOCUMENTS

| | | |
|---|---|---|
| KR | 10-0883268 B1 | 2/2009 |
| KR | 10-2009-0115030 A | 11/2009 |
| WO | WO 2008-051124 A1 | 5/2008 |

* cited by examiner

*Primary Examiner* — Kamran Afshar
*Assistant Examiner* — Omoniyi Obayanju
(74) *Attorney, Agent, or Firm* — McKenna Long & Aldridge LLP

(57) ABSTRACT

Provided are a method and a device for transmitting an IWS (Inter-Working signal) of a femto base station in a wireless communication system. The femto base station generates a sequence of a preamble including information about a frequency band on which the femto base station operates, maps the IWS including the sequence of the preamble to a plurality of subcarriers on a frequency domain, and transmits the IWS to a terminal through the subcarriers. The IWS can be mapped to the plurality of subcarriers positioned on one equal OFDM (Orthogonal Frequency Division Multiplexing) symbol on a time domain or a plurality of preset RUs (Resource Unit).

9 Claims, 20 Drawing Sheets

METHOD AND DEVICE FOR TRANSMITTING IWS IN A WIRELESS COMMUNICATION SYSTEM

CROSS-REFERENCE TO RELATED APPLICATIONS

This application is a 35 U.S.C. 371 National Stage entry of International Application No. PCT/KR2010/001060, filed on Feb. 22, 2010, and claims the benefit of priority of U.S. Provisional application No. 61/154,421 filed Feb. 22, 2009, and Korean Patent Application No. 10-2010-0015208 filed Feb. 19, 2010, each of which are hereby incorporated by reference in their entirety as if fully set forth herein.

BACKGROUND OF THE INVENTION

1. Field of the Invention

The present invention relates to wireless communication and, more particularly, to a method and device for transmitting an interworking signal (IWS) in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

Orthogonal frequency division multiple access (OFDMA) is a multi-access scheme in which some of available subcarriers are independently provided to respective users in a system using an OFDM as a modulation scheme, thus realizing multiple accesses. In the OFDMA, frequency resources such as subcarriers are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

The femto base station (BS) technique can be applicable to the 802.16m system, which is recently actively studied. A femto BS refers to a small mobile communication BS used in indoor areas such as homes, offices, and the like. A femto BS is used to have a meaning similar to that of pico-cell, and generally, a femto BS is recognized to have an advanced function compared with a pico-cell. A femto BS, which generally has low transmission power, provides an access to a subscriber group including access providers. The femto BS is connected to an IP network propagating in homes and offices, and accesses a core network (CN) of a mobile communication system through the IP network to provide a mobile communication service. Namely, the femto BS is connected to the CN of the mobile communication system through a broadband connection such as a digital subscriber line (DSL), or the like. Also, the femto BS may communicate with a femto BS-overlaid macro BS by exchanging a control message with each other through air interface. A user of the mobile communication system may be provided with a service in an outdoor area through an existing macro BS and may be provided with a service in an indoor area through the femto BS.

Complementing a degradation of a service of an existing macro BS within a building, the femto BS improves an indoor coverage of a mobile communication system and provides a service only to determined particular users, so the femto BS can provide high quality voice service and data service. Also, the efficiency of a next-generation cellular system using a high frequency band can be enhanced by reducing the size of a cell, and since several cells each having a small size are used, the number of times of reducing frequency can be advantageously increased. In addition, the femto BS can provide a new service which is not provided in the macro BS, and the propagation of the femto BS accelerates a fixed-mobile convergence (FMC) and reduces the industry-based costs.

In general, the femto BS operates within a predetermined frequency band and may use the same frequency band as or a different frequency band from that of the macro BS. Coverage of the femto BS may overlap with that of the macro BS. The femto BS is required to be synchronized with a network by a common timing, frequency, and cell ID, and the femto BS and the macro BS may be discriminated by a cell ID. When the macro BS and the femto BS coexist, a mobile station may check the presence of the femto BS and attempt handover to the femto BS. Here, in order to check the presence of the femto BS, various methods may be proposed.

SUMMARY OF THE INVENTION

An aspect of the present invention provides a method and apparatus for transmitting an interworking signal in a wireless communication system.

In an aspect, a method for transmitting an interworking signal (IWS) of a femto base station (BS) in a wireless communication system is provided. The method includes generating a sequence of a preamble including information on a frequency band on which the femto BS operates, mapping the IWS including the sequence of a preamble to a plurality of subcarriers of a frequency domain, and transmitting the IWS to a user equipment (UE) through the plurality of subcarriers. The preamble may further include information on identification (ID) of the femto BS. The IWS may further include a sequence of data. The IWS may be mapped to a plurality of subcarriers positioned on a same orthogonal frequency division multiplexing (OFDM) symbol on a time domain. The length of the IWS may be uniform regardless of bandwidth. The plurality of subcarriers may be subcarriers excluding subcarriers to which pilots are mapped. The plurality of subcarriers may be subcarriers excluding the subcarriers to which pilots are mapped and subcarriers adjacent to the subcarriers to which pilots are mapped. The IWS may be mapped to a plurality of predefined resource units (RUs). The plurality of RUs may be one of four contiguous RUs (CRUs) and four distributed RUs (DRUs).

In another aspect, a method for performing handover by a user equipment (UE) in a wireless communication system is provided. The method includes receiving interworking signals (IWSs) transmitted by femto base stations, detecting neighboring femto BSs by using a preamble included in the IWSs, determining whether to perform handover to any one target femto BS among the detected femto BSs, transmitting a handover request message to a macro BS, and performing handover to the target femto BS. The preamble may include information on a frequency band on which the femto BS operates.

In another aspect, a transmitter in a wireless communication system is provided. The transmitter includes a radio frequency (RF) unit transmitting and receiving a radio signal, and a processor, coupled to the RF unit, and configured for generating a preamble including information regarding a frequency band on which a femto BS operates, mapping an interworking signal (IWS) including the preamble to a plurality of subcarriers, and transmitting the mapped IWS to a user equipment (UE).

Overhead applied when a UE searches for neighboring femto BSs can be reduced.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarification, the following description will focus on the IEEE 802.16m. However, technical features of the present invention are not limited thereto.

Figure 1:
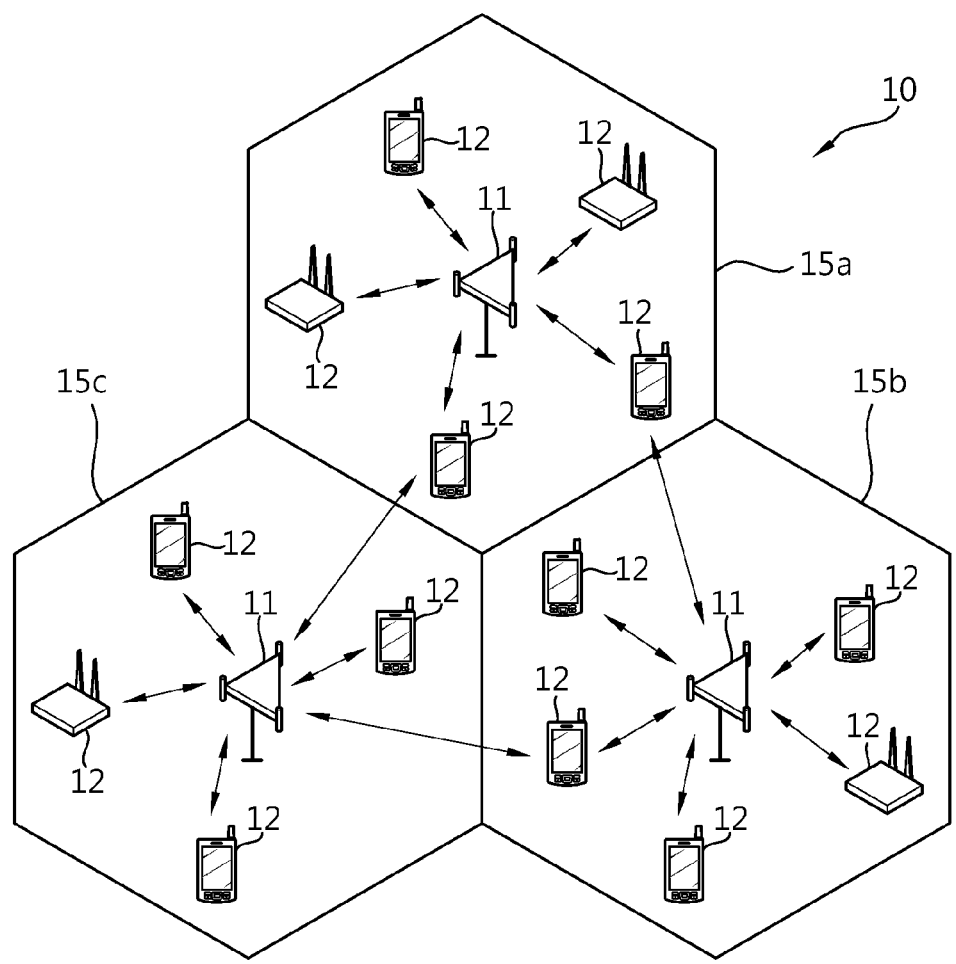
FIG. 1 is a view showing a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15*a*, 15*b*, and 15*c*. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
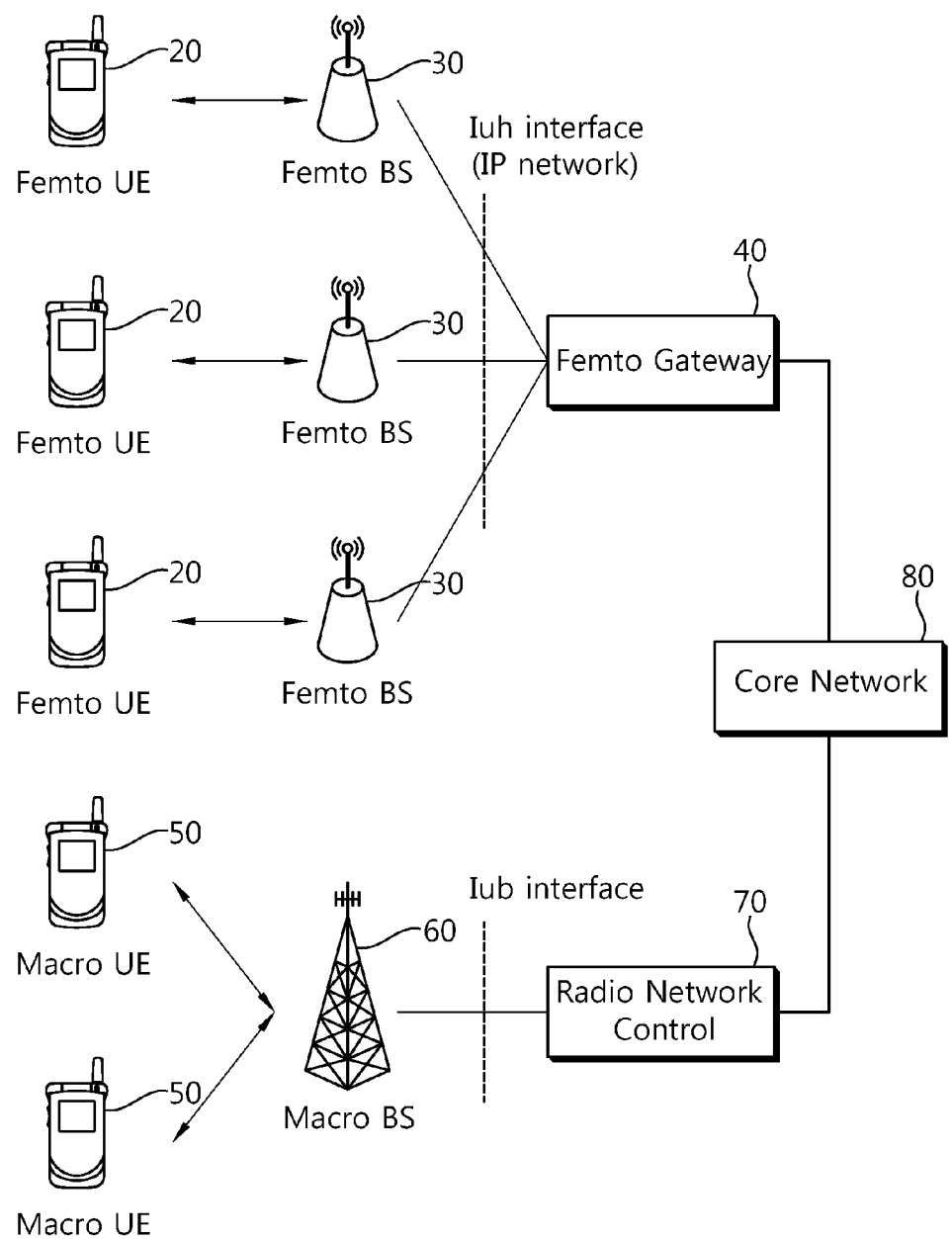
FIG. 2 shows a wireless communication system using a femto base station (BS).

FIG. 2 shows a wireless communication system using a femto base station (BS).

Base stations (BSs) may be divided into femto BSs 30 and a macro BS 60 according to a cell coverage or deployment method. Cells of the femto BSs have a size smaller than that of the macro BS 60. A portion or the entirety of each of the femto BSs may overlap with the macro BS 60. The femto BS may also be called by other names such as femto cell, home node-B, closed subscriber group (CSG), or the like. The macro BS may be called by macro-cell, being discriminated from the femto cell.

The femto BS is connected to a femto gateway 40 through an Iuh interface. The Iuh interface refers to an interface between a femto BS and a femto gateway through an IP network. The femto gateway is an entity managing at least one femto BS. The femto gateway may perform a registration, authentication, and security procedure of the femto BS to allow the femto BS to access a core network (CN) of the wireless communication system. The macro BS is connected to a radio network control (RNC) 70 through an Iub interface. The RNC, an entity managing at least one macro BS, connects the macro BS to the CN. The macro BS is connected to the CN by a dedicated line, while the femto BS is connected to the CN through an IP network.

A UE connected to the femto BS is a femto UE 20, and a UE connected to the macro BS is called a macro UE 50. The femto UE may become a macro UE through handover to the macro BS, and the macro UE may become a femto UE through handover to the femto BS.

Figure 3:
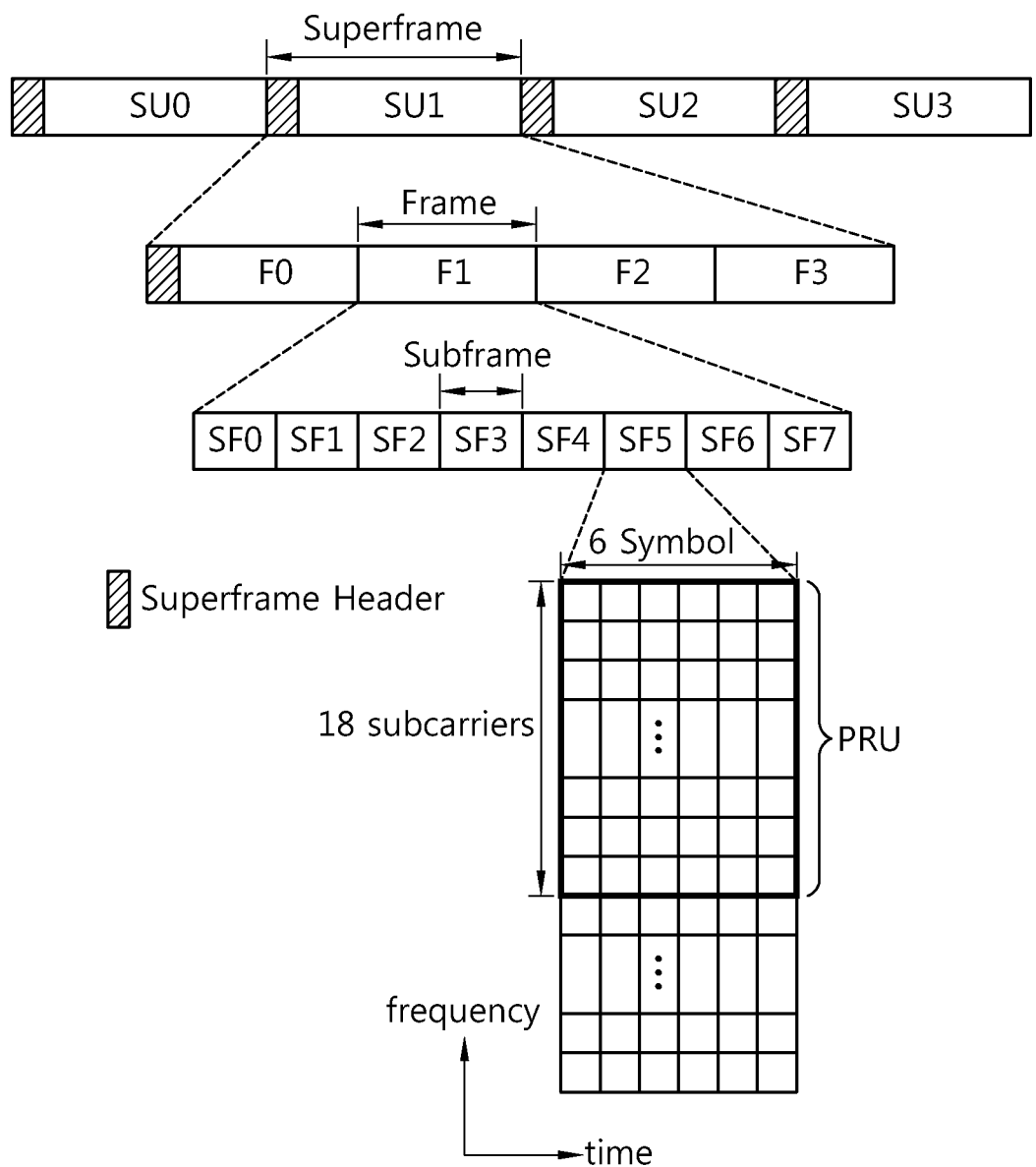
FIG. 3 shows an example of a frame structure.

FIG. 3 shows an example of a frame structure.

Referring to FIG. 3, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

A superframe header (SFH) can carry an essential system parameter and system configuration information. The SFH may be located in a first subframe of a superframe. The SFH may occupy last 5 OFDMA symbols of the first subframe. The SFH can be classified into a primary-SFH (P-SFH) and a secondary-SFH (S-SFH). The P-SFH and the S-SFH can be transmitted in every superframe.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols on a time domain, and includes a plurality of subcarriers on the frequency domain. An OFDM symbol is for representing one symbol period, and can be referred to as other terminologies such as an OFDMA symbol, an SC-FDMA symbol, etc., according to a multiple access scheme. The subframe can consist of 5, 6, 7, or 9 OFDM symbols. However, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

Time division duplex (TDD) or frequency division duplex (FDD) may be applied to the frame. In the TDD, each subframe is used in uplink or downlink transmission at the same frequency and at a different time. That is, subframes included in a TDD frame are divided into an uplink subframe and a downlink subframe on the time domain. In the FDD, each subframe is used in uplink or downlink transmission at the same time and at a different frequency. That is, subframes included in an FDD frame are divided into an uplink subframe and a downlink subframe on the frequency domain. Uplink transmission and downlink transmission occupy different frequency bands and can be simultaneously performed.

One OFDM symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

| Channel bandwidth, BW (MHz) | | | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling frequency, Fs (MHz) | | | 5.6 | 8 | 10 | 11.2 | 22.4 |
| FFT size, $N_{FFT}$ | | | 512 | 1024 | 1024 | 1024 | 2048 |
| Subcarrier spacing, Δf (kHz) | | | 10.94 | 7.81 | 9.77 | 10.94 | 10.94 |
| Useful symbol time, Tb (μs) | | | 91.4 | 128 | 102.4 | 91.4 | 91.4 |
| G = 1/8 | Symbol time, Ts (μs) | | 102.857 | 144 | 115.2 | 102.857 | 102.857 |
| | FDD | Number of OFDMA symbols per 5 ms frame | 48 | 34 | 43 | 48 | 48 |
| | | Idle time (μs) | 62.857 | 104 | 46.40 | 62.857 | 62.857 |
| | TDD | Number of OFDMA symbols per 5 ms frame | 47 | 33 | 42 | 47 | 47 |
| | | TTG + RTG (μs) | 165.714 | 248 | 161.6 | 165.714 | 165.714 |
| G = 1/16 | Symbol time, Ts (μs) | | 97.143 | 136 | 108.8 | 97.143 | 97.143 |
| | FDD | Number of OFDMA symbols per 5 ms frame | 51 | 36 | 45 | 51 | 51 |
| | | Idle time (μs) | 45.71 | 104 | 104 | 45.71 | 45.71 |
| | TDD | Number of OFDMA symbols | 50 | 35 | 44 | 50 | 50 |

-continued

| | | | | | | | |
|---|---|---|---|---|---|---|---|
| G = 1/4 | | per 5 ms frame TTG + RTG (μs) | 142.853 | 240 | 212.8 | 142.853 | 142.853 |
| | Symbo | time, Ts (μs) | 114.286 | 160 | 128 | 114.286 | 114.286 |
| | FDD | Number of OFDMA symbols per 5 ms frame | 43 | 31 | 39 | 43 | 43 |
| | | Idle time (μs) | 85.694 | 40 | 8 | 85.694 | 85.694 |
| | TDD | Number of OFDMA symbols per 5 ms frame | 42 | 30 | 38 | 42 | 42 |
| | | TTG + RTG (μs) | 199.98 | 200 | 136 | 199.98 | 199.98 |
| Number of Guard subcarriers | | Left | 40 | 80 | 80 | 80 | 160 |
| | | Right | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ denotes a smallest power of 2 greater than $N_{used}$. A sampling factor is defined as $F_s$=floor(n·BW/8000)×8000. A subcarrier spacing is defined as $\Delta f = F_s/N_{FFT}$. A useful symbol time is defined as $Tb=1/\Delta f$. A CP time is defined as $Tg=G \cdot Tb$. An OFDMA symbol time is defined as $Ts=Tb+Tg$. A sampling time is defined as $Tb/N_{FFT}$.

Figure 4:
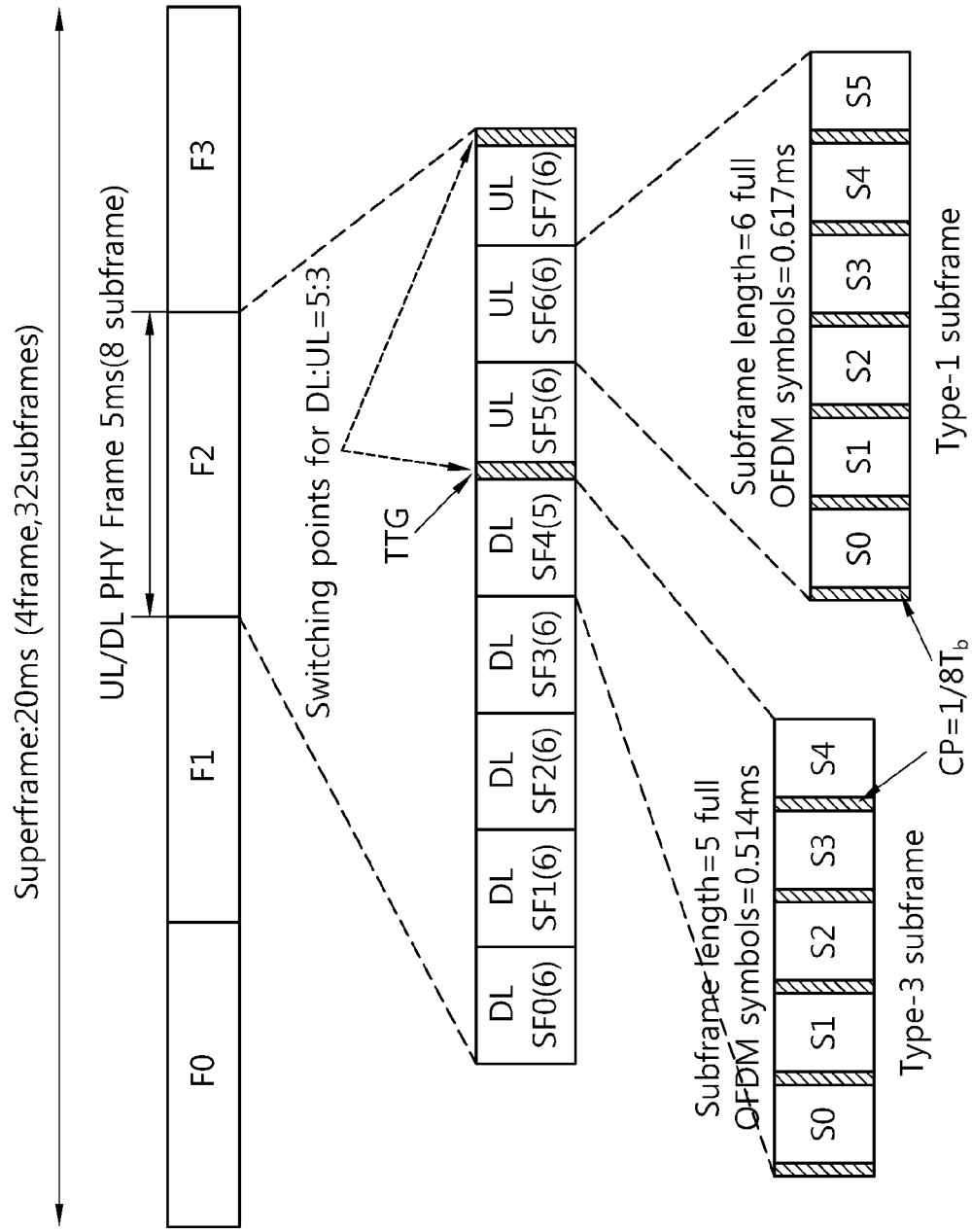
FIG. 4 shows an example of a TDD frame structure.

FIG. 4 shows an example of a TDD frame structure. In this case, G=1/8. A superframe having a length of 5 ms includes four frames F0, F1, F2, and F3. One frame includes eight subframes SF0, SF1, SF2, SF3, SF4, SF5, SF6, and SF7, and the ratio between downlink subframes and uplink subframes is 5:3. The TDD frame structure in FIG. 4 may be applicable to a case in which a bandwidth is 5 MHz, 10 MHz, or 20 MHz. The final downlink subframe SF4 includes five OFDM symbols, and the other subframes include six subframes, respectively.

Figure 5:
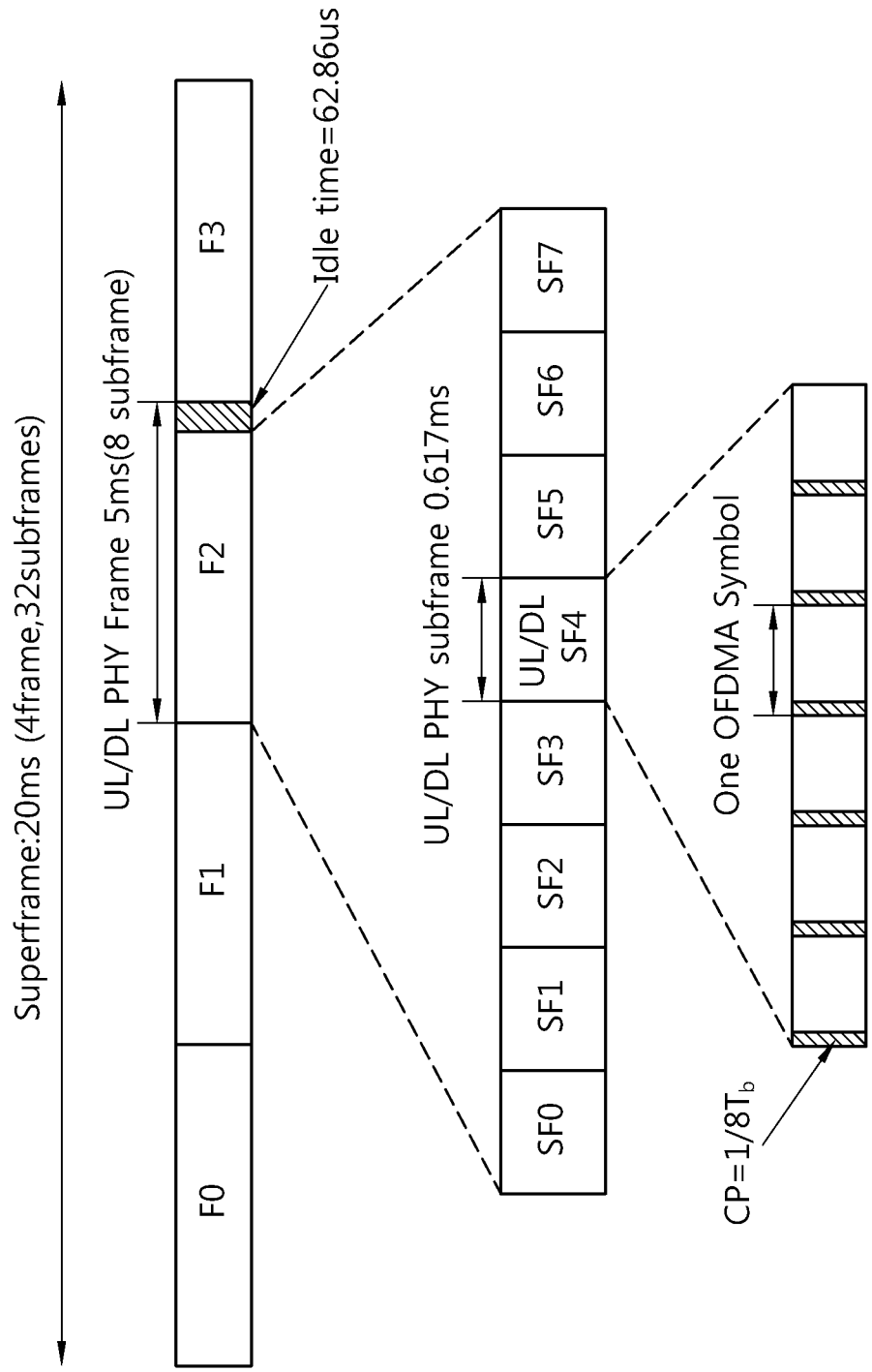
FIG. 5 shows an example of an FDD frame structure.

FIG. 5 shows an example of an FDD frame structure. In this case, G=1/8. A superframe having a length of 20 ms includes four frames F0, F1, F2, and F3. One frame includes eight subframes SF0, SF1, SF2, SF3, SF4, SF5, SF6, and SF7, and every subframe includes a downlink area and an uplink area. The FDD frame structure in FIG. 5 may be applicable to a case in which a bandwidth is 5 MHz, 10 MHz, or 20 MHz.

Figure 6:
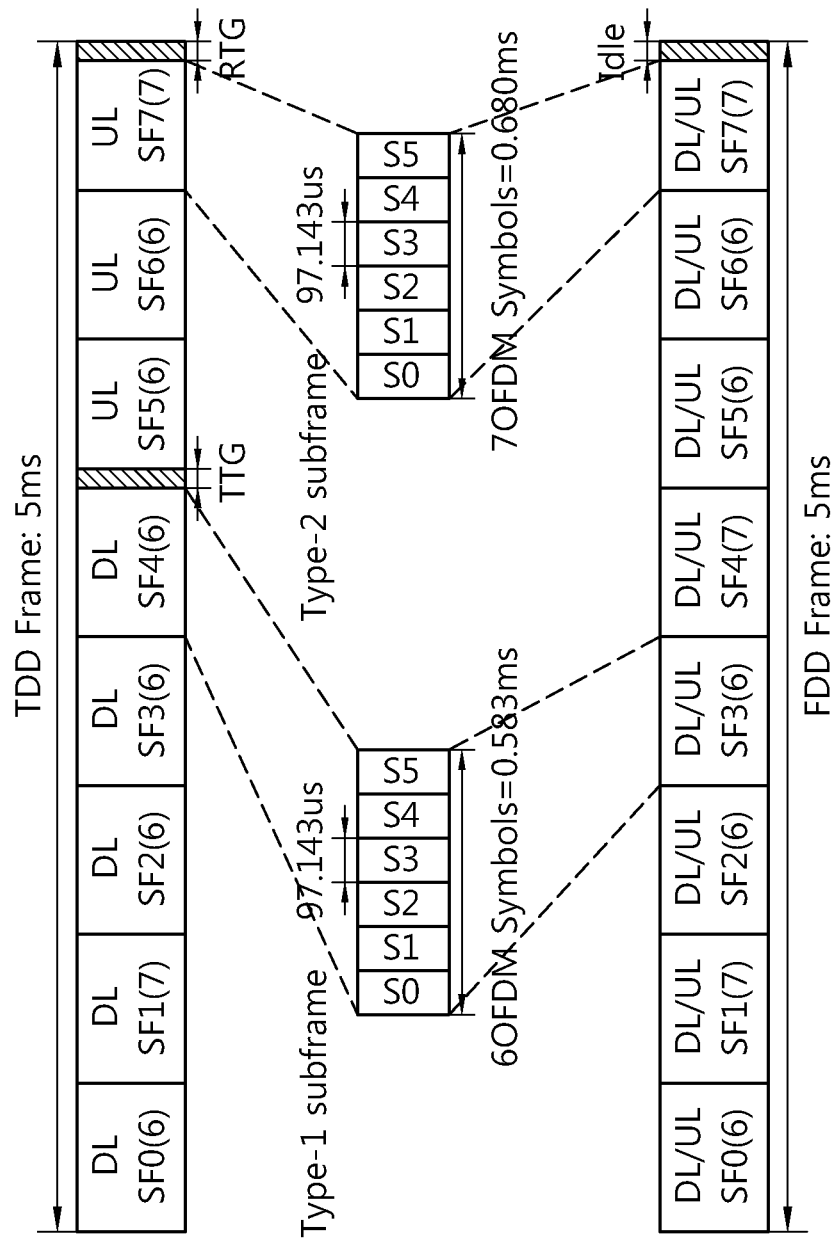
FIG. 6 shows an example of a frame structure.

FIG. 6 shows an example of a frame structure. In this case, G=1/16. The frame structure in FIG. 6 may be applicable to both FDD and TDD systems. Eight subframes SF0, SF1, SF2, SF3, SF4, SF5, SF6, and SF7 exist, and the ratio between downlink subframes and uplink subframes is 5:3. The TDD frame structure in FIG. 6 may be applicable to a case in which a bandwidth is 5 MHz, 10 MHz, or 20 MHz. Each subframe may include six or seven OFDM symbols.

A subframe includes a plurality of physical resource units (PRUs) on the frequency domain. A PRU, which is a basic physical unit for a resource allocation, includes a plurality of consecutive OFDM symbols on a time domain and a plurality of consecutive subcarriers on the frequency domain. The number of OFDM symbols included in a PRU may be equal to the number of OFDM symbols included in a single subframe. Thus, the number of OFDM symbols within a PRU may be determined according to a type of a subframe. For example, when a single subframe includes six OFDM symbols, the PRU may be defined by 18 subcarriers and six OFDM symbols.

A logical resource unit (LRU) is a basic logical unit for allocating distributed resources and contiguous resources. The LRU is defined by a plurality of OFDM symbols and a plurality of subcarriers, and includes pilots used in a PRU. Thus, an appropriate number of subcarriers in a single LRU relies on the number of allocated pilots. A distributed resource unit (DRU) may be used to obtain a frequency diversity gain. A DRU includes subcarrier groups distributed in a single frequency partition. The size of a DRU is equal to that of a PRU. A minimum unit forming a DRU is a single subcarrier. A contiguous resource unit (CRU) may be used to obtain a frequency selective scheduling gain. The CRU includes a local subcarrier group. The size of the CRU is equal to that of a PRU.

A femto BS may be divided as follows according to a subscription method.

1) Closed subscriber group (CSG)—closed femto BS: It is a femto BS allowing only a UE that has been subscribed to a CSG to access. A UE, not a subscriber of the CSG, cannot access the femto BS, and it can access only an emergency service.

2) CSG—open femto BS: UEs that have subscribed to the CSG have priority of accessing it, and even UEs which have not subscribed to the CSG may access it with low priority. In this case, however, quality of service (QoS) of the UEs which have subscribed to the CSG should not be degraded as the UEs which have not been subscribed to the CSG access it.

3) Open subscriber group (OSG): It is a femto BS any UE can access regardless of a subscription.

A CSG femto BS indicates any one of the CSG—closed femto BS of 1) and the CSG—open femto BS of 2).

When a femto BS is a CSG—closed femto BS, interference may be generated between a macro BS and the femto BS. In this case, the interference may be generated when a macro MS serving by the macro BS is close to the femto BS.

Various methods may be proposed as methods for searching for a femto BS by a UE.

1) The macro BS may inform the UE about a list of neighboring femto BSs. The macro BS is required to inform the UE to be connected to the macro BS about every list as available. In order for the macro BS to inform the UE about the list of femto BSs, the UE may search for an A-preamble (Advanced preamble) or an interworking signal (IWS) and report the results to the macro BS, or the macro BS must directly use a location-based service (LBS). When the number of femto BSs is large, overhead is increased.

2) The UE may search for every available femto BS to obtain network access information to thus check presence of a femto BS. The UE is required to search for the A-preamble applied to the femto BS within a different frequency band as well as a frequency band on which the macro BS operates.

3) A femto BS may detect a UE therearound and report corresponding results to the macro BS. This is a method in which the femto BS receives a signal transmitted by the UE to the macro BS to detect the UE therearound, which is called snooping. The femto BS may transmit the detection results to the macro BS through a backbone network. In this case, however, large overhead may be applied to the femto BS and inaccurate information may be transmitted according to transmission power of the UE.

Hereinafter, a method in which the femto BS using an IWS informs UEs around the femto BS about its presence is proposed. The femto BS may inform a plurality of UEs about its presence by transmitting an IWS to the plurality of UEs. In the method of 2), since the UEs must read the A-preambles of all the femto BSs as many as possible, large overhead is generated in the UEs, while in the proposed invention, since the femto BS transmits a designated area of a radio resource by a relatively long period, the UEs can easily determine the presence of femto BS.

Figure 7:
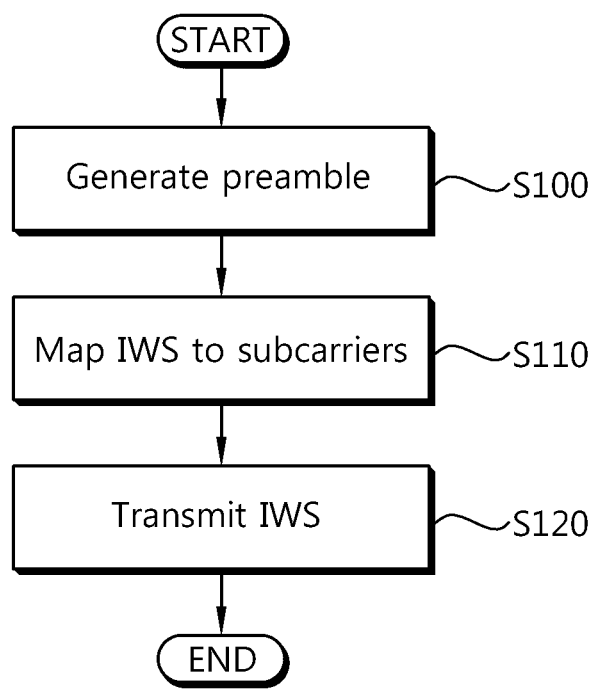
FIG. 7 shows an embodiment of a proposed method for transmitting an interworking signal (IWS).

FIG. 7 shows an embodiment of a proposed method for transmitting an interworking signal (IWS).

In step S100, the femto BS generates a preamble including information on a frequency band on which the femto BS operates.

In step S110, the femto BS maps an IWS including the preamble to subcarriers.

The IWS may include data besides the preamble. When the data is included, detection performance of the femto BS may be reduced, but radio resources can be effectively used. When the IWS includes N number of preamble-mapped subcarriers, $\lfloor \log_2(n) \rfloor$ bits may be transmitted, and the preamble may include information regarding a frequency band and information regarding an ID of the femto BS. Meanwhile, if P-bit data is transmitted when the IWS includes L number of data-mapped subcarriers, a modulation and coding scheme (MCS) level may be determined to be QPSK 1/m (m=L*2/P). The data may include information on the ID of the femto BS and a cyclic redundancy check (CRC).

When the IWS is mapped to subcarriers, it may occupy particular OFDM symbols. Here, as for the particular OFDM symbols, OFDM symbols in a subframe having five OFDM symbols in a TDD frame may be excluded. Or, the OFDM symbols may be OFDM symbols within a subframe having seven OFDM symbols in an FDD frame with G=1/16. Permutation with respect to the IWS may follow a permutation rule of a P-preamble.

Meanwhile, the length of the IWS on the frequency domain mapped to the particular OFDM symbols may be fixed regardless of the overall bandwidth. For example, when the overall bandwidth is one of 5 MHz, 10 MHz, and 20 MHz, the IWS may occupy 5 MHz regardless of a bandwidth. Or, the IWS may occupy particular OFDM symbols such that it occupies the other remaining subcarriers than subcarriers to which a pilot signal is mapped. Or, the IWS may be mapped to the other remaining subcarriers, excluding the subcarriers to which the pilot signal is mapped and subcarriers adjacent to the subcarriers to which the pilot signals is mapped. Accordingly, reduction of channel estimation performance because of the reduction of the number of pilots can be avoided.

Figure 8:
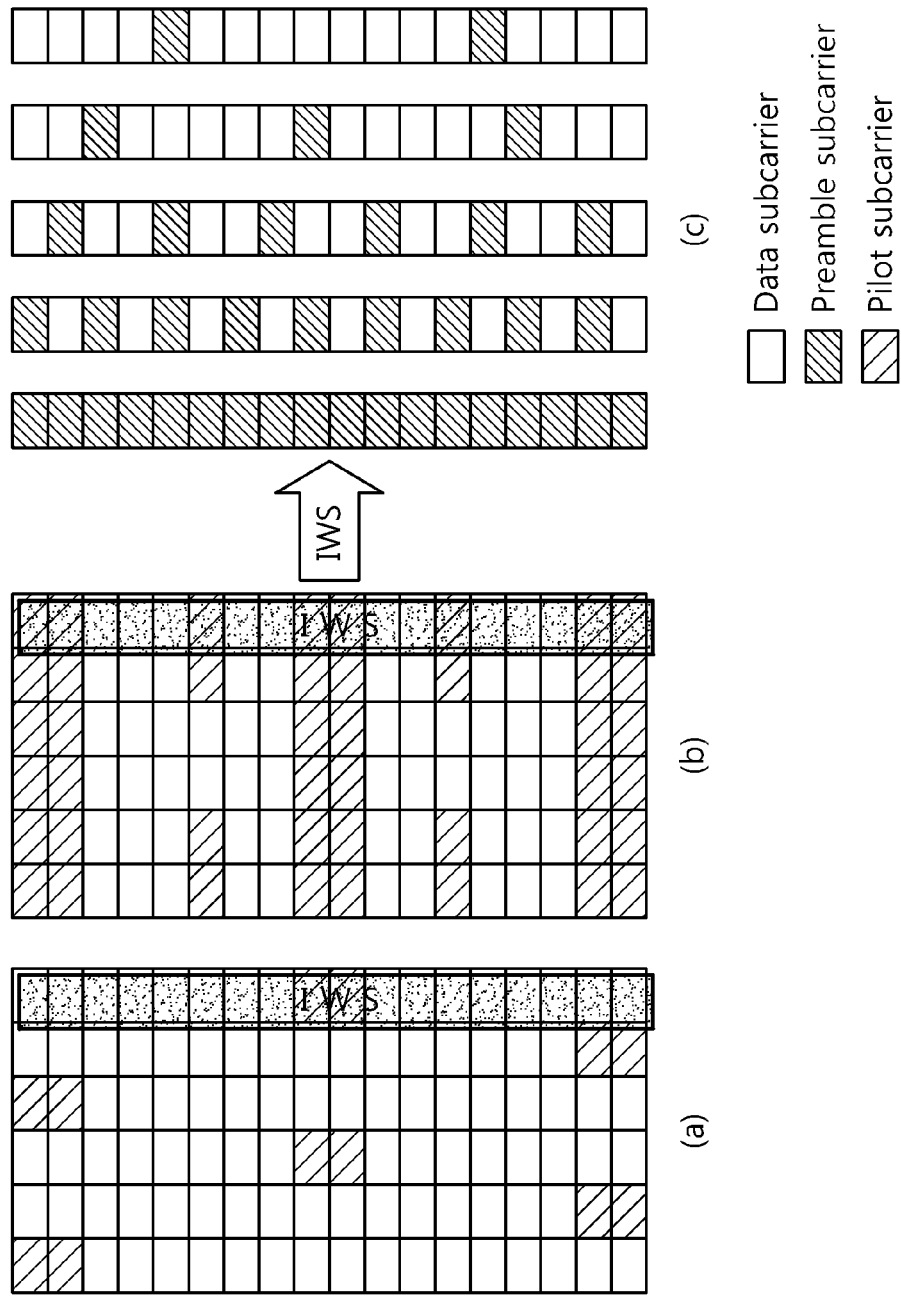
FIGS. 8 to 10 show an example of a resource unit (RU) when an IWS is mapped to particular OFDM symbols according to the proposed invention.
Figure 9:
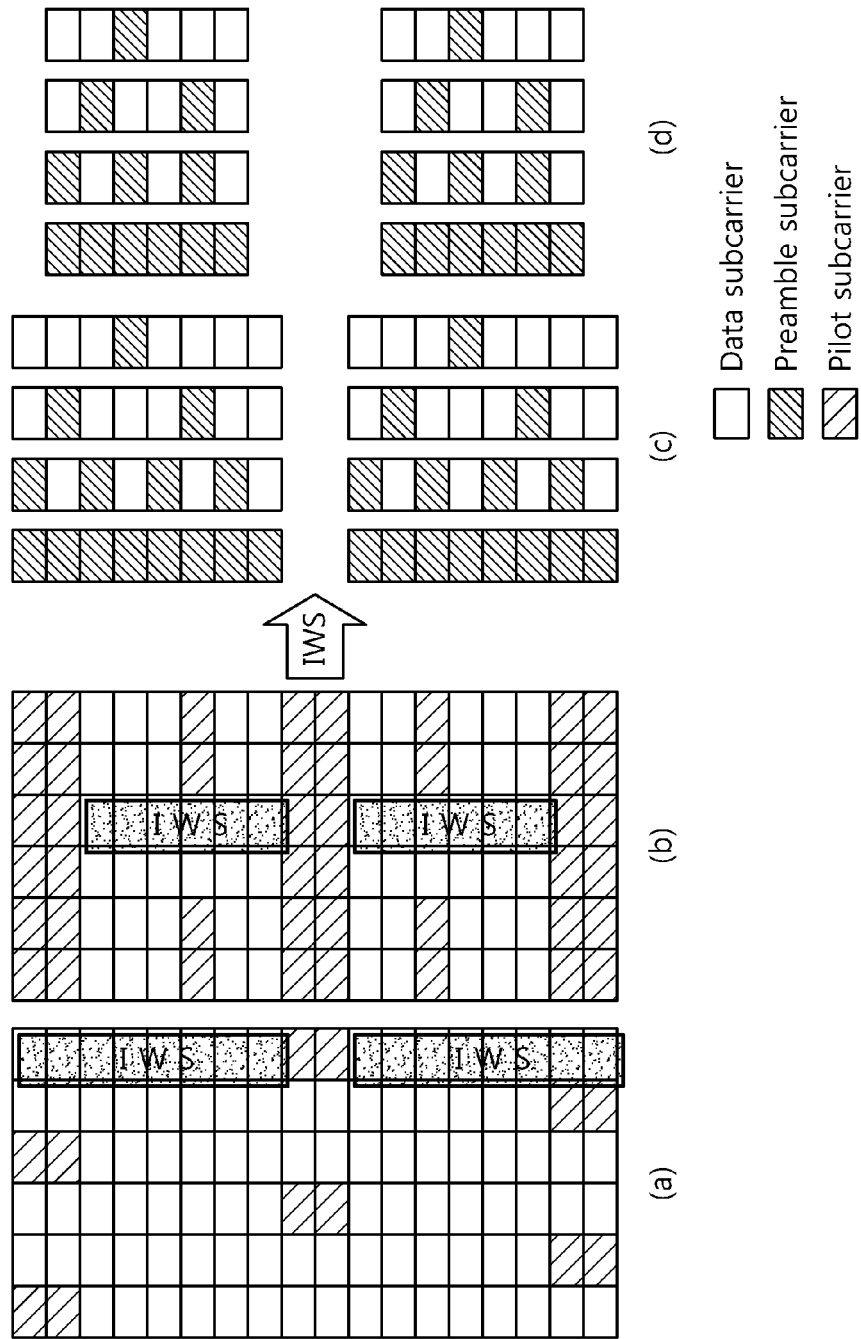
Figure 10:
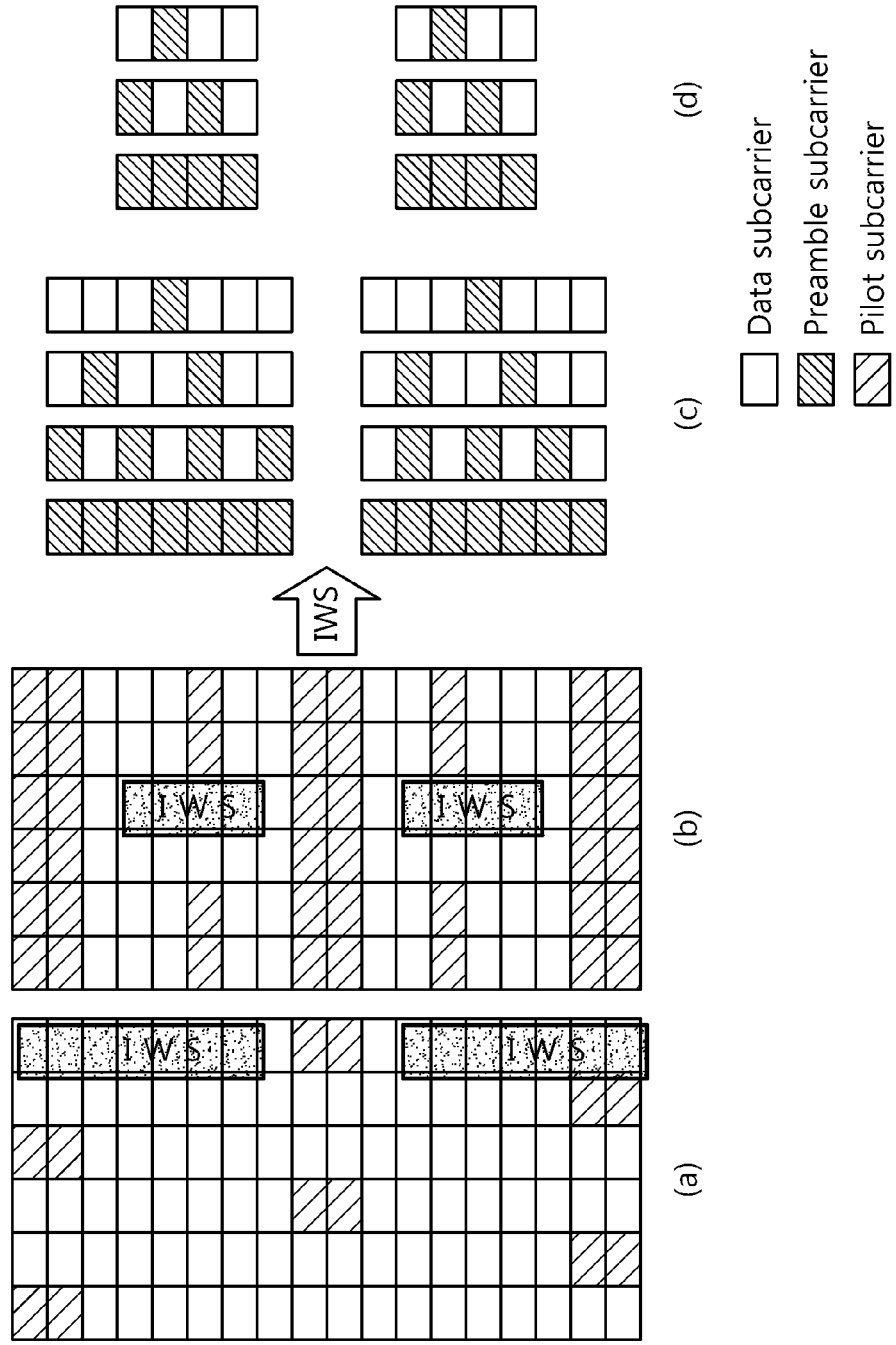

FIGS. 8 to 10 show an example of a resource unit (RU) when the IWS is mapped to particular OFDM symbols according to the proposed invention.

FIG. 8 shows a case in which the IWS is mapped to the entirety of subcarriers of particular OFDM symbols. With reference to FIGS. 8-(*a*) and 8-(*b*), the IWS is mapped to every subcarrier regardless of a pilot signal. FIG. 8-(*c*) shows various examples of the configuration of the IWS mapped to the RUs of FIGS. 8-(*a*) and 8-(*b*). The IWS may include only a preamble or may include the preamble and data together. The position of the preamble in the IWS may be changed or shifted on the frequency domain.

FIG. 9 shows a case in which an IWS is mapped to subcarriers excluding subcarriers to which pilots are mapped. With reference to FIGS. 9-(*a*) and 9-(*b*), the IWS is mapped to subcarriers excluding subcarriers to which a pilot signal is mapped. FIG. 9-(*c*) shows various examples of the configuration of the IWS mapped to the RUs of the FIG. 9-(*a*), and FIG. 9-(*d*) shows various examples of the configuration of the IWS mapped to the RUs of the FIG. 9-(*b*). The IWS may include only a preamble or may include the preamble and data together. The position of the preamble in the IWS may be changed or shifted on the frequency domain.

FIG. 10 shows a case in which the IWS is mapped to subcarriers, excluding subcarriers to which pilots are mapped and subcarriers adjacent to the subcarriers to which pilots are mapped. With reference to FIGS. 10-(*a*) and 10-(*b*), the IWS is mapped to subcarriers, excluding subcarriers to which pilots are mapped and subcarriers adjacent to the subcarriers to which pilots are mapped. FIG. 10-(*c*) shows various examples of the configuration of the IWS mapped to the RUs of the FIG. 10-(*a*), and FIG. 10-(*d*) shows various examples of the configuration of the IWS mapped to the RUs of the FIG. 10-(*b*). The IWS may include only a preamble or may include the preamble and data together. The position of the preamble in the IWS may be changed or shifted on the frequency domain. Since one subcarrier at the side of the subcarriers to which the pilot signal is additionally emptied, a degradation of channel estimation performance when frequency synchronization is not matched can be prevented.

Also, the IWS may be allocated in units of at least one RU. The IWS may be mapped to RUs of any of the plurality of subframes. Or, the RU may be a subframe having six OFDM symbols when G=1/8 or G=1/16, or may be a subframe having five OFDM symbols and using a TTG area as one additional symbol. The IWS may be mapped to a plurality of RUs, and the plurality of RUs may be four CRUs or four DRUs. When the IWS is mapped to four DRUs, a diversity gain can be obtained. Or, when synchronization of a timing or frequency is not matched, an offset may be allocated to the time domain or the frequency domain, and accordingly, the IWS may not be allocated to the first symbol and subcarrier and the last symbol and subcarrier in each RU. Accordingly, a reduction in the channel estimation performance of the UE can be avoided.

Figure 11:
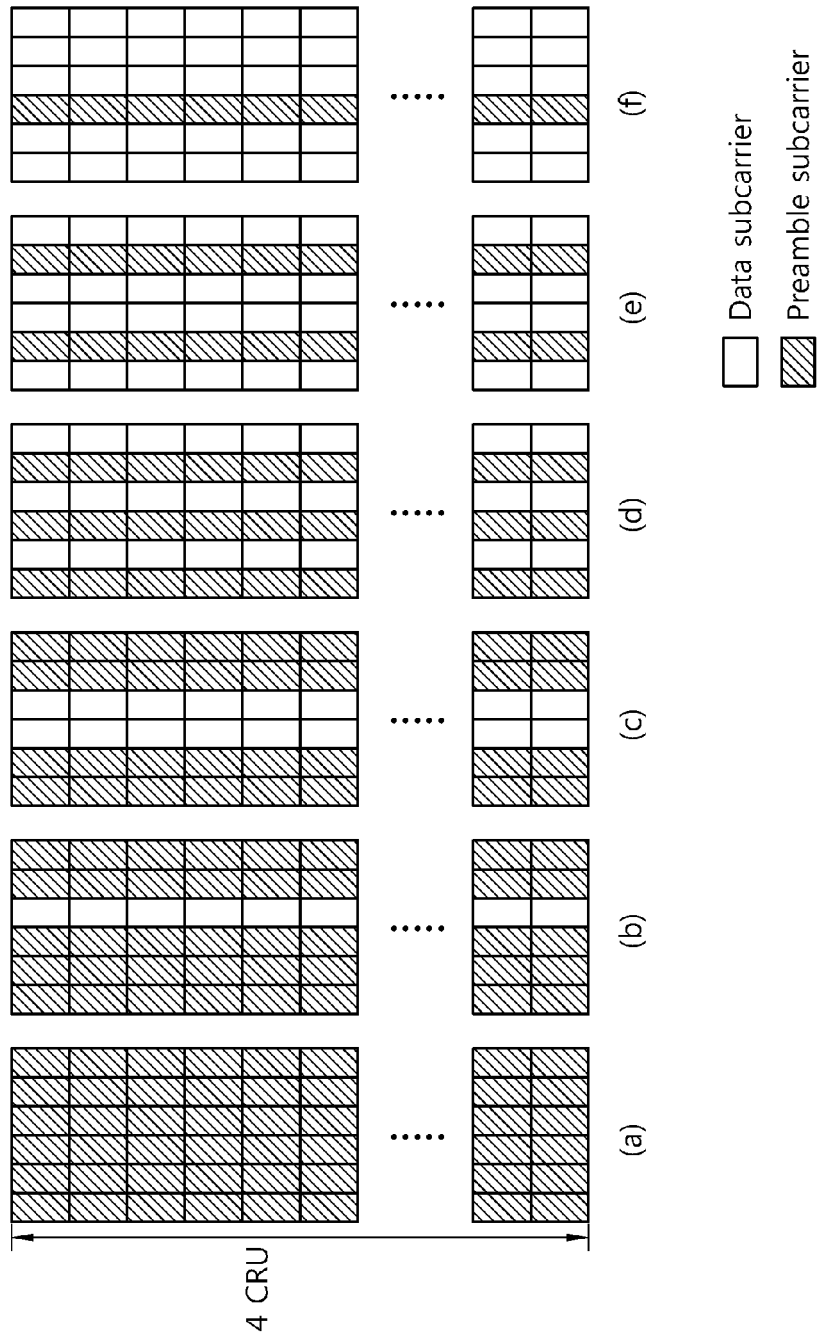
FIGS. 11 to 13 show a case in which an IWS is mapped to four CRUs.
Figure 12:
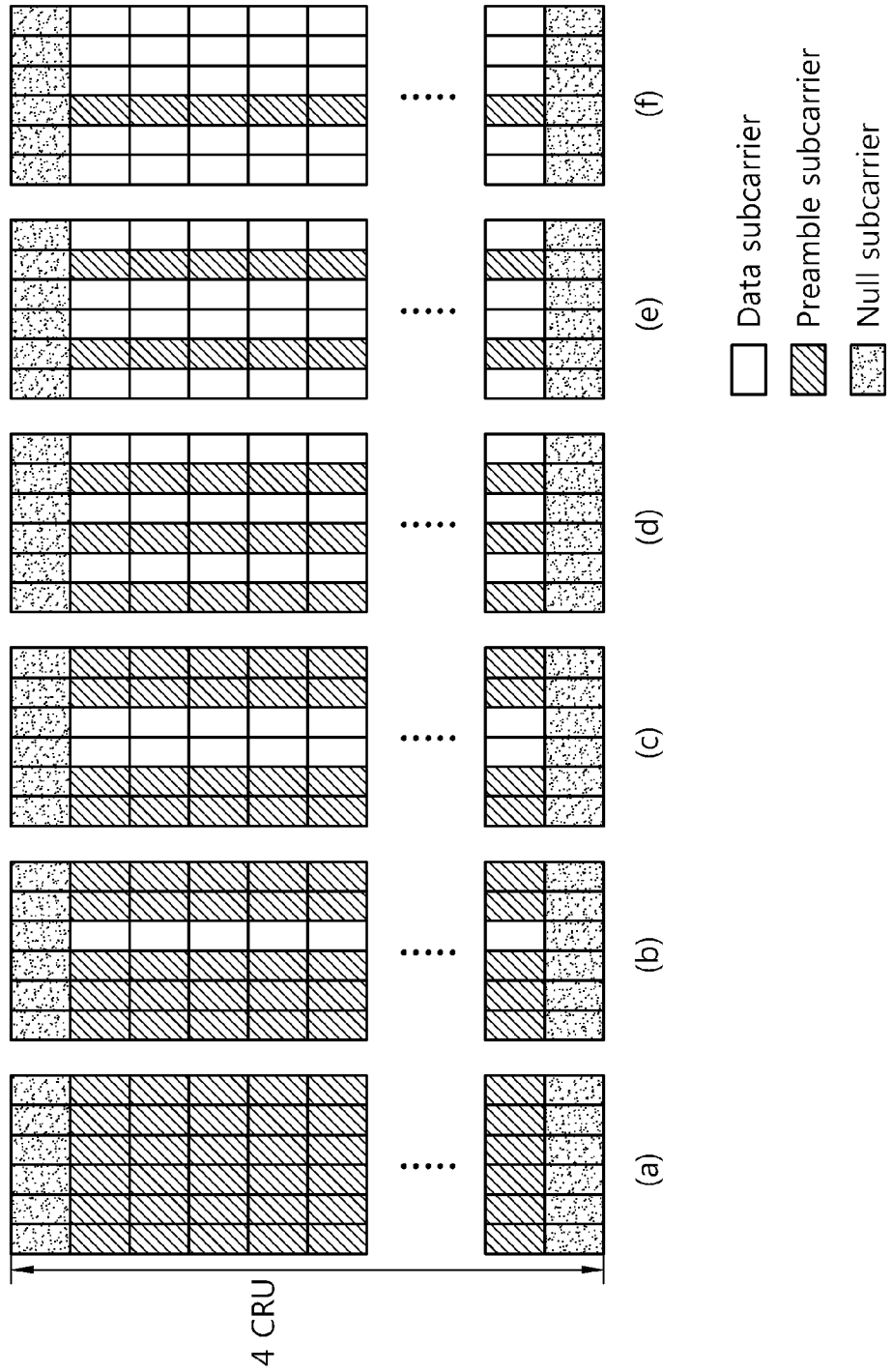
Figure 13:
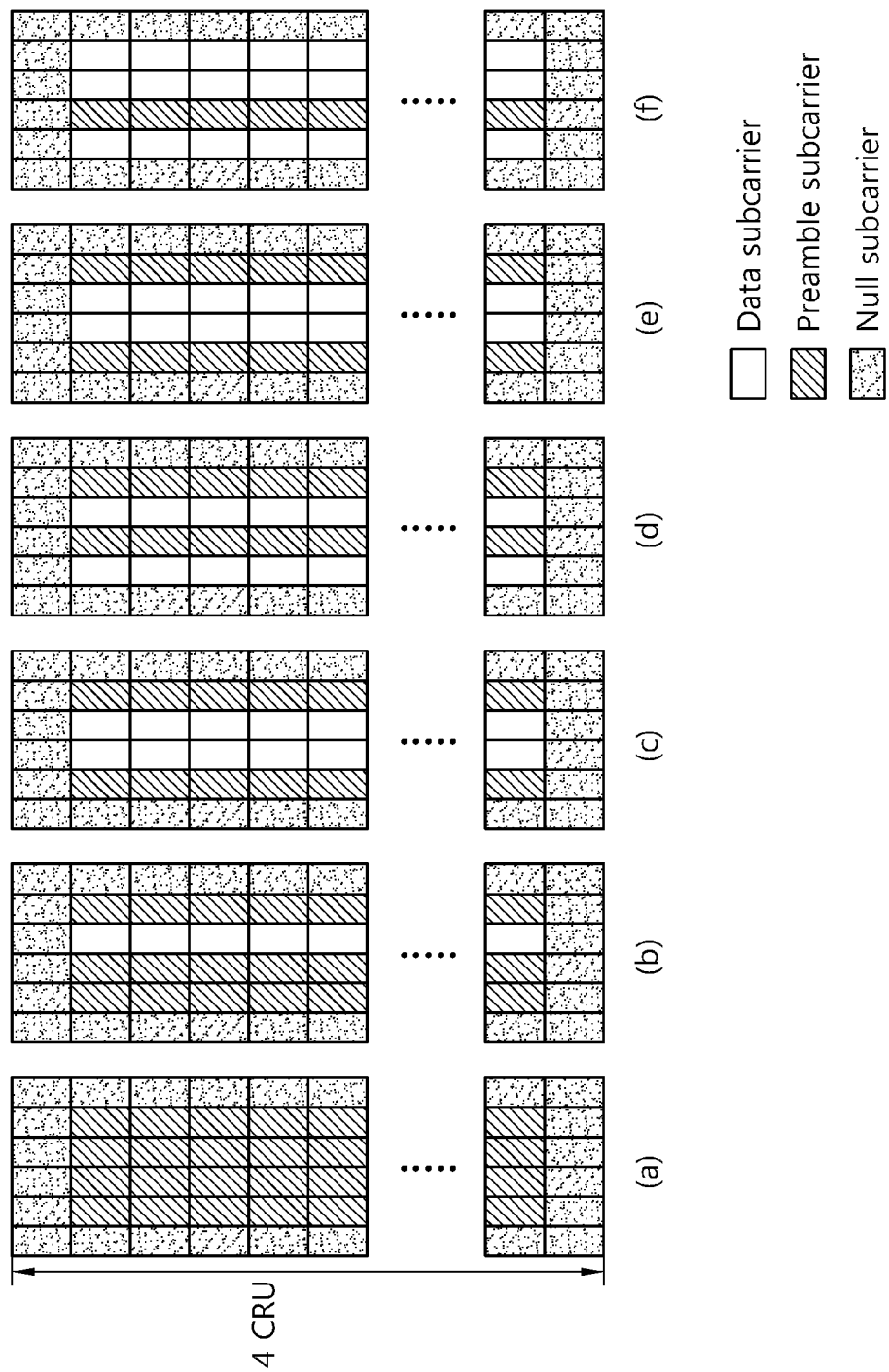

FIGS. 11 to 13 show a case in which an IWS is mapped to four CRUs. The four CRUs may be included in any subframe. One CRU may include 18 subcarriers on the frequency domain, so four CRUs may be comprised of 72 contiguous subcarriers.

FIG. 11 shows a case in which an IWS is mapped to all the subcarriers included in four CRUs. FIGS. 11-(*a*) and 11-(*f*) show various examples of the configuration of the IWS mapped to RUs. The IWS may include only a preamble or may include the preamble and data together. The configuration of the IWS is not limited thereto and the OFDM symbols in which a preamble is positioned may be variably changed.

FIG. 12 shows a case in which an IWS is mapped to subcarriers, excluding the first and the last subcarriers, among the subcarriers included in the four CRUs. This is for a frequency offset. FIGS. 12-(*a*) to 12-(*f*) show various examples of the configuration of the IWS mapped to RUs. The IWS may include only a preamble or may include the preamble and data together. The configuration of the IWS is not limited thereto and the OFDM symbols in which a preamble is positioned may be variably changed.

FIG. 13 shows a case in which an IWS is mapped to subcarriers, excluding the first and the last subcarriers and the first and the last OFDM symbols, among the subcarriers included in the four CRUs. This is for a frequency offset and a timing offset. The last OFDM symbol of the CRU may also be used as a TTG symbol. FIGS. 13-(a) to 13-(f) show various examples of the configuration of the IWS mapped to RUs. The IWS may include only a preamble or may include the preamble and data together. The configuration of the IWS is not limited thereto and the OFDM symbols in which a preamble is positioned may be variably changed.

Figure 14:
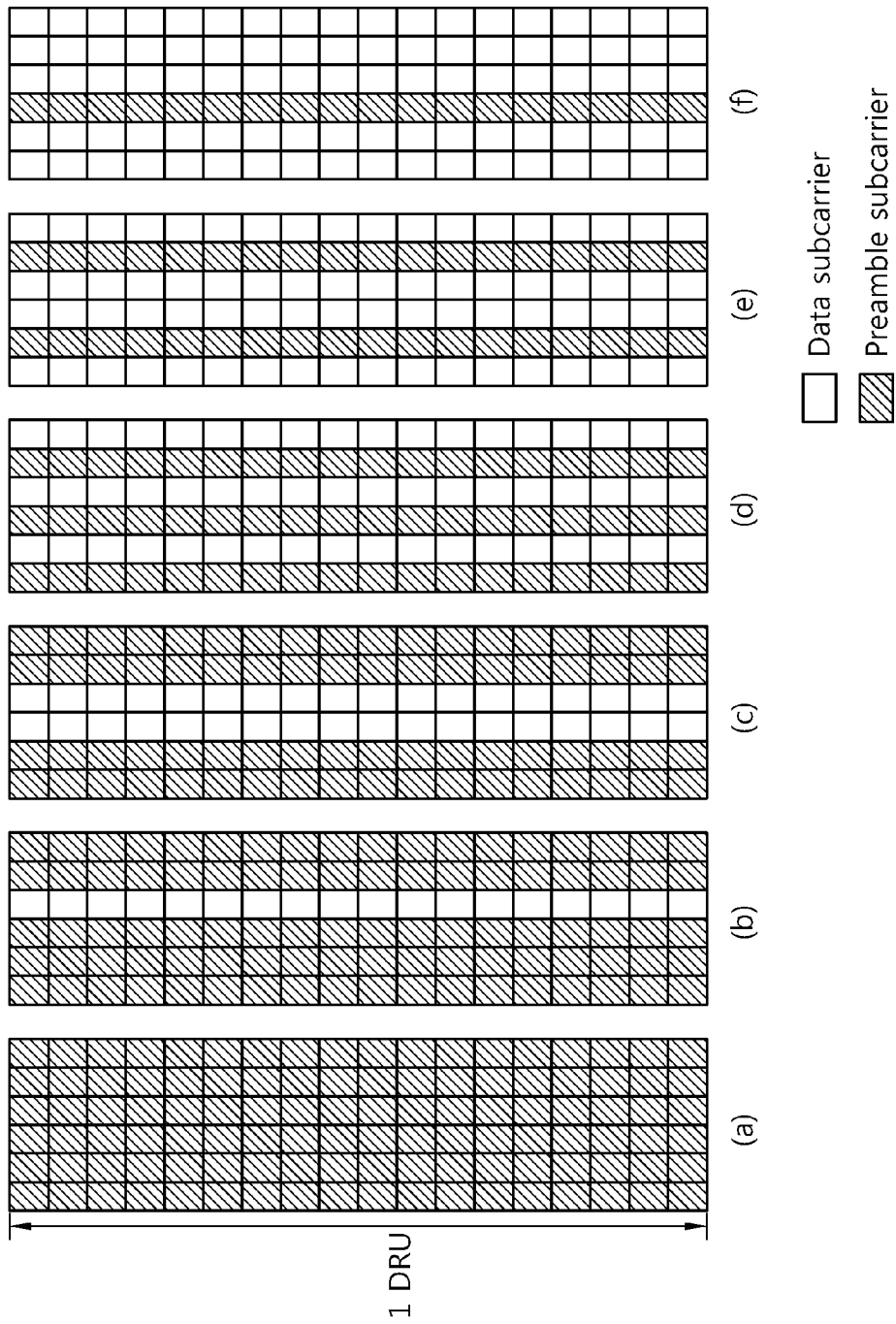
FIGS. 14 to 16 show a case in which an IWS is mapped to four DRUs.
Figure 15:
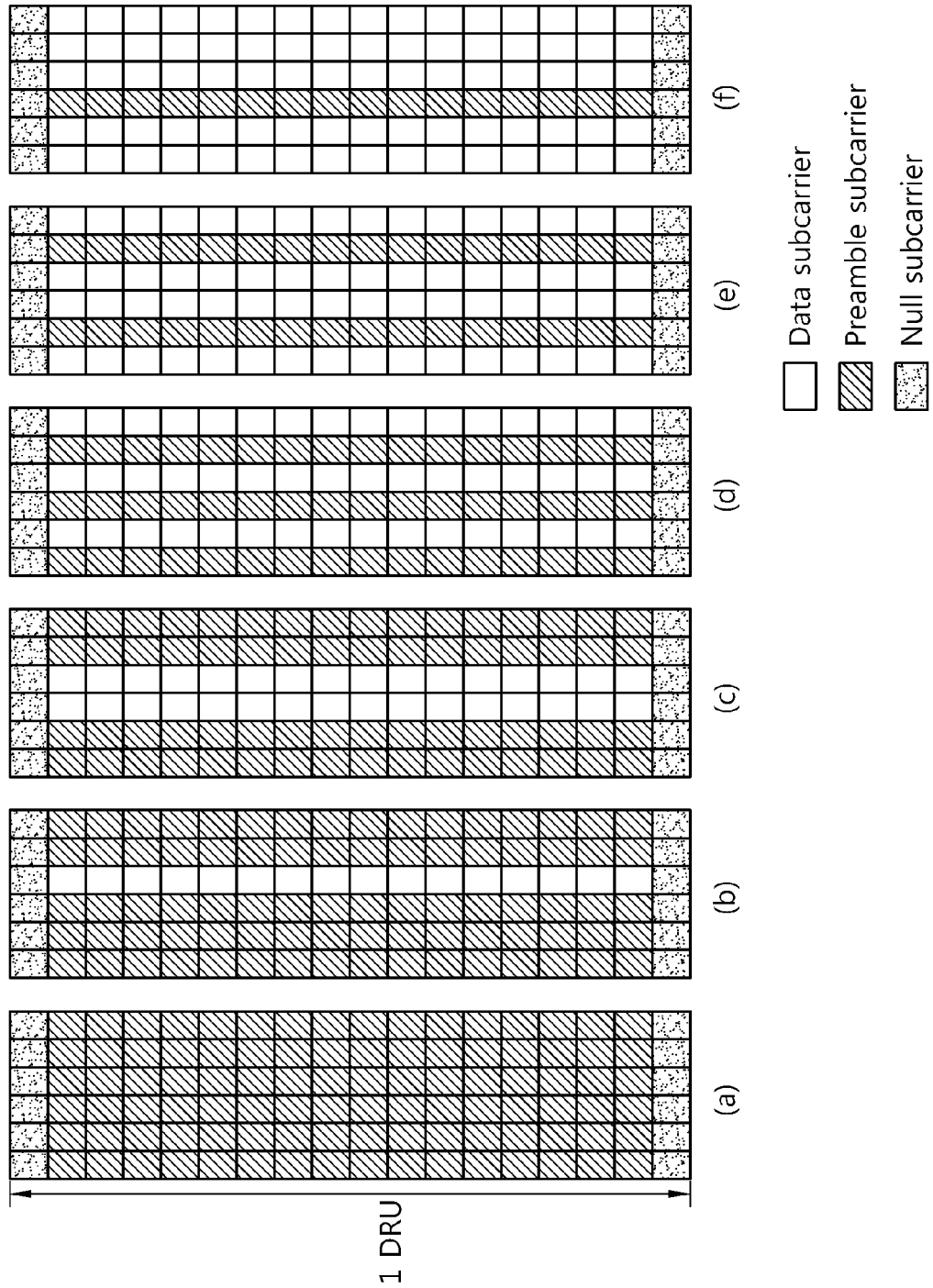
Figure 16:
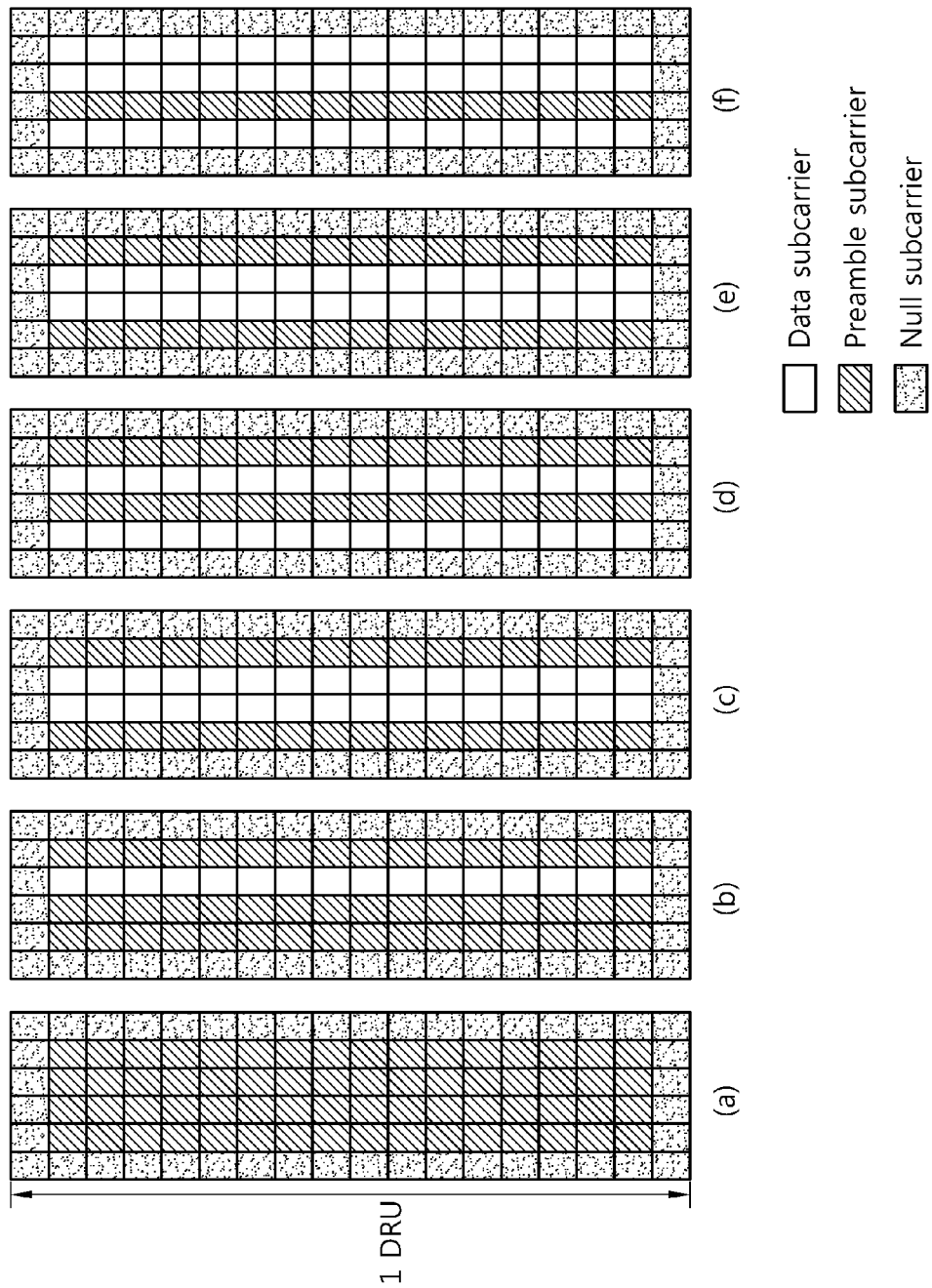

FIGS. 14 to 16 show a case in which an IWS is mapped to four DRUs. The four DRUs may be included in any subframe. One DRU can include 18 subcarriers on the frequency domain, so four DRUs may be comprised of 72 subcarriers.

FIG. 14 shows a case in which an IWS is mapped to all the subcarriers included in four DRUs. FIGS. 14-(a) and 14-(f) show various examples of the configuration of the IWS mapped to RUs. In this example, only one DRU is illustrated, but it may be applicable in the same manner to four DRUs. The IWS may include only a preamble or may include the preamble and data together. The configuration of the IWS is not limited thereto and the OFDM symbols in which a preamble is positioned may be variably changed.

FIG. 15 shows a case in which an IWS is mapped to subcarriers, excluding the first and the last subcarriers, among the subcarriers included in the respective DRUs constituting four DRUs. This is for a frequency offset. FIGS. 15-(a) to 15-(f) show various examples of the configuration of the IWS mapped to RUs. In this example, only one DRU is illustrated, but it may be applicable in the same manner to four DRUs. The IWS may include only a preamble or may include the preamble and data together. The configuration of the IWS is not limited thereto and the OFDM symbols in which a preamble is positioned may be variably changed.

FIG. 16 shows a case in which an IWS is mapped to subcarriers, excluding the first and the last subcarriers and the first and the last OFDM symbols, among the subcarriers included in the four DRUs. This is for a frequency offset and a timing offset. The last OFDM symbol of the DRU may also be used as a TTG symbol. FIGS. 16-(a) to 16-(f) show various examples of the configuration of the IWS mapped to RUs. The IWS may include only a preamble or may include the preamble and data together. The configuration of the IWS is not limited thereto and the OFDM symbols in which a preamble is positioned may be variably changed.

Figure 17:
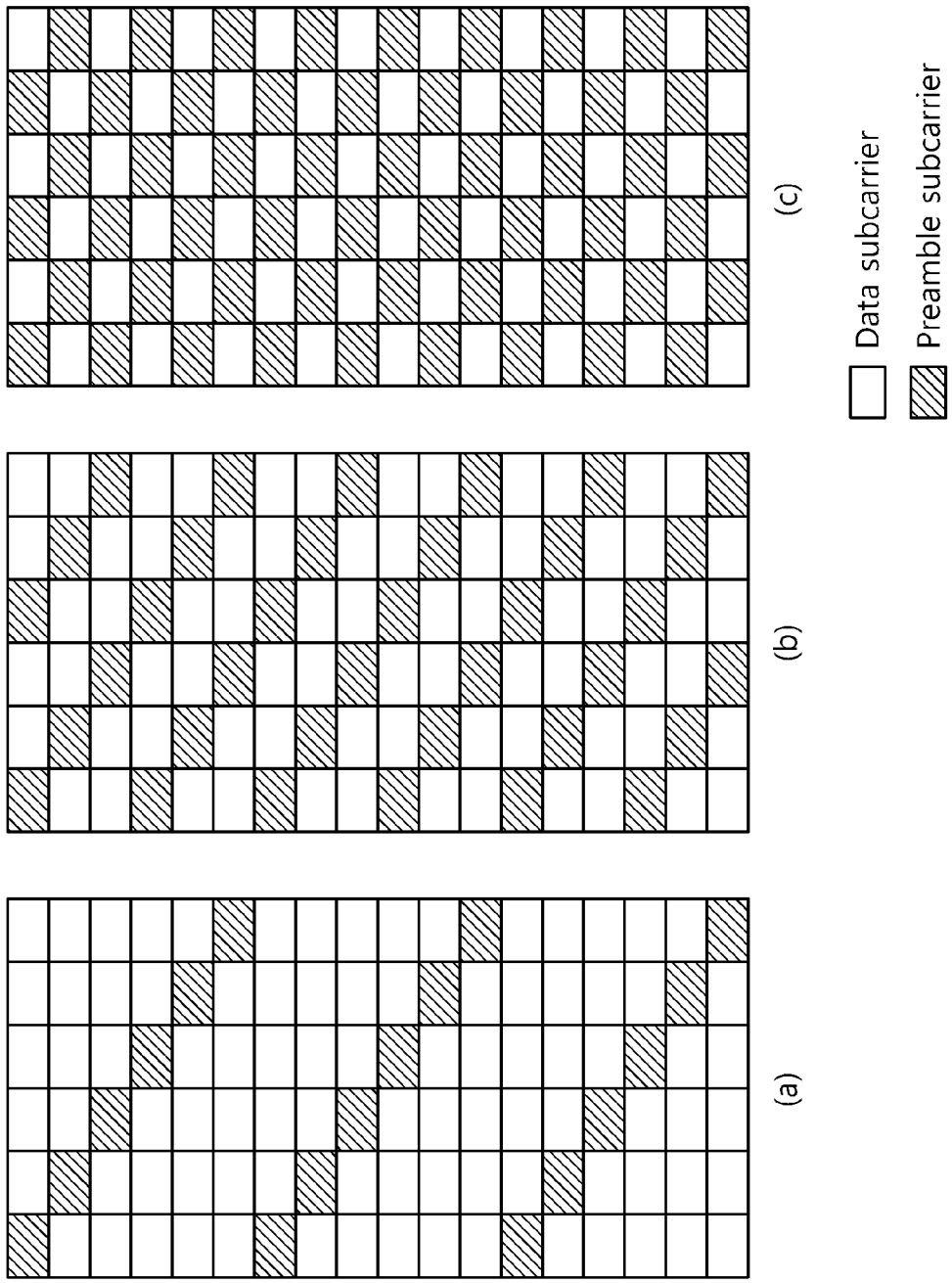
FIGS. 17 and 18 show another example of a configuration of an IWS.
Figure 18:
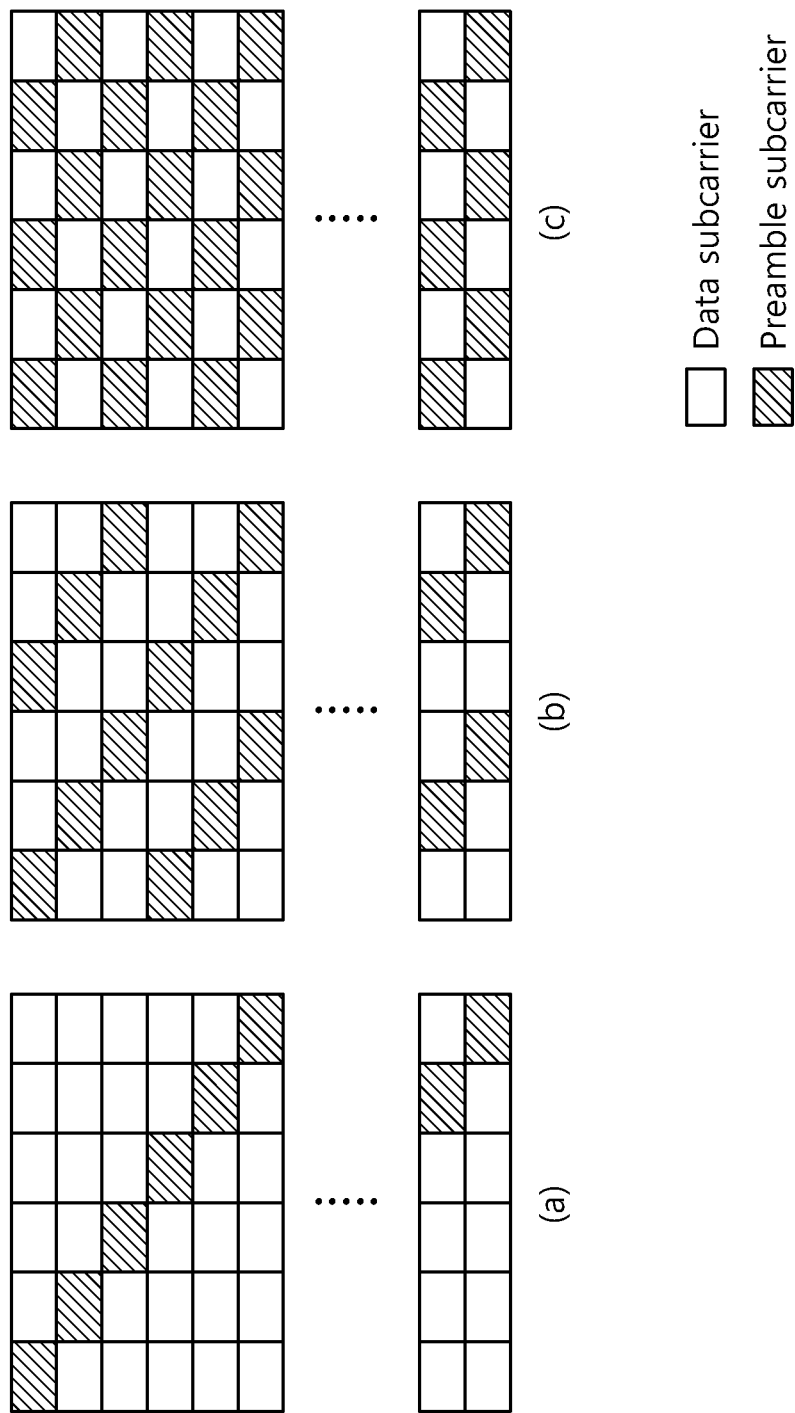

FIGS. 17 and 18 show another example of a configuration of an IWS. An IWS may be occupy particular OFDM symbols so as to be mapped thereto, may occupy a particular subcarrier so as to be mapped, or may be mapped to go crisscross on RUs. FIGS. 17 and 18 show a case in which preambles are mapped to go crisscross on RUs in an IWS.

With reference to FIG. 7, in step S120, the femto BS transmits an IWS to the UE. The UE may receive the IWS and read the preamble in the IWS. In this case, the UE may know about frequency bands in which the femto BSs existing around the UE operate, and accordingly, the UE can search for an appropriate femto BS to which the UE can perform handover by searching for only a corresponding frequency band. When an appropriate femto BS is determined, the UE may perform handover to the target femto BS.

Figure 19:
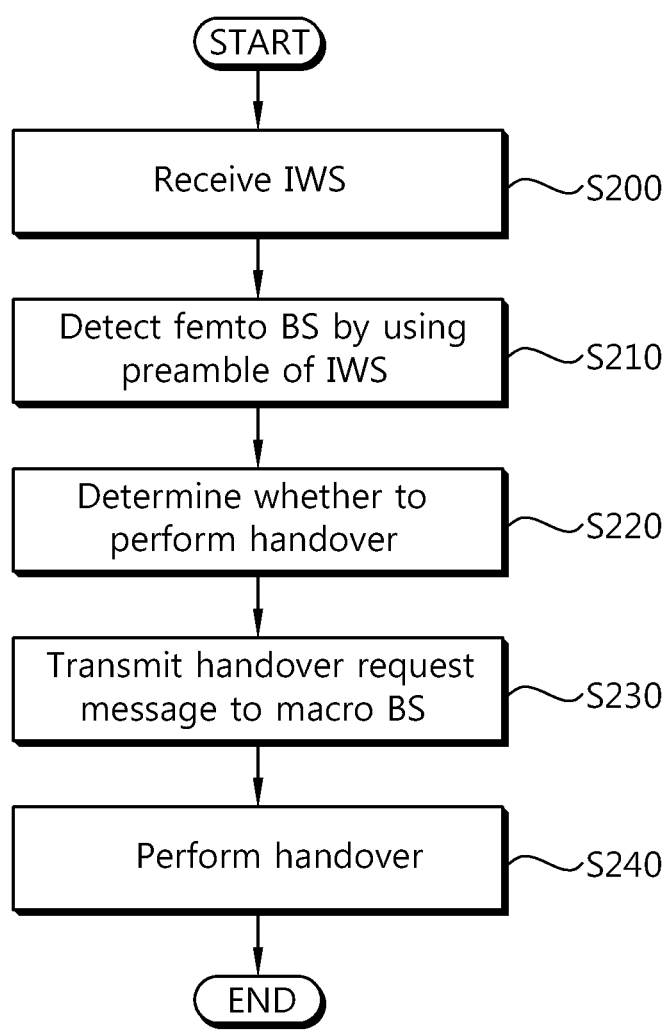
FIG. 19 shows an embodiment of a proposed handover method.

FIG. 19 shows an embodiment of a proposed handover method.

In step S200, the UE receives an IWS transmitted by the femto BS. In step S210, the UE reads a preamble included in the IWS to detect nearby femto BSs. In step S220, the UE determines whether to perform handover to the appropriate target femto BS among the nearby femto BSs. When the UE determines to perform handover to the target femto BS, the UE transmits a handover request message to a macro BS in step S230. In step S240, the UE performs handover to the target femto BS.

Figure 20:
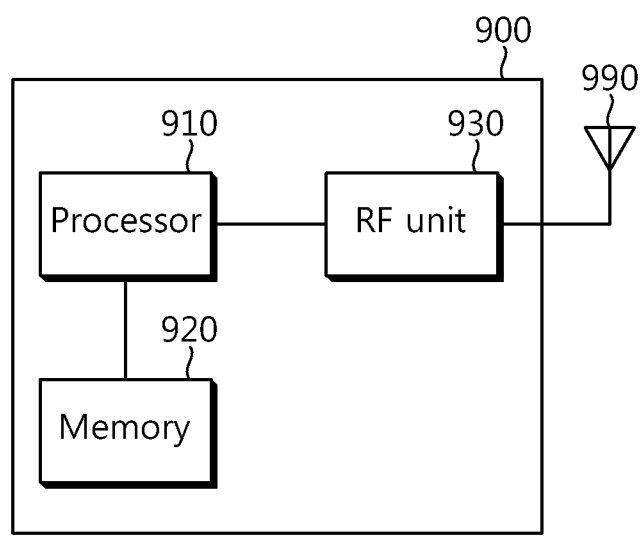
FIG. 20 is a block diagram showing a transmitter for implementing an embodiment of the present invention.

FIG. 20 is a block diagram showing a transmitter for implementing an embodiment of the present invention. A transmitter 900 includes a processor 910, a memory 920, and an RF unit 930.

Referring to FIG. 20, the processor 910 implements the proposed functions, procedures, and/or methods.

The memory 920 is coupled to the processor 910, and stores a variety of information for driving the processor 910. The RF unit 930 is coupled to the processor 910, and transmits and/or receives a radio signal.

The processor 910 may include an application-specific integrated circuit (ASIC), another chip set, a logical circuit, and/or a data processing unit. The RF unit 920 may include a baseband circuit for processing radio signals. In software implemented, the aforementioned methods can be implemented with a module (i.e., process, function, etc.) for performing the aforementioned functions. The module may be performed by the processor 910.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for transmitting, by a femto base station (BS), an interworking signal (IWS) which informs user equipments (UEs) around the femto BS of its presence in a wireless communication system, the method comprising:
   generating a sequence of a preamble including information on a frequency band on which the femto BS operates;
   mapping the IWS including the sequence of the preamble to a plurality of subcarriers of a frequency domain; and
   transmitting the IWS to the UEs through the plurality of subcarriers,
   wherein the IWS is mapped to a plurality of subcarriers positioned on a same orthogonal frequency division multiplexing (OFDM) symbol on a time domain,
   wherein a length of the IWS on the frequency domain is fixed regardless of bandwidth, and
   wherein the plurality of subcarriers is subcarriers excluding the subcarriers to which pilots are mapped and subcarriers adjacent to the subcarriers to which pilots are mapped.

2. The method of claim 1, wherein the preamble further includes information on identification (ID) of the femto BS.

3. The method of claim 1, wherein the IWS further includes a sequence of data.

4. The method of claim 1, wherein the plurality of subcarriers is subcarriers excluding subcarriers to which pilots are mapped.

5. The method of claim 1, wherein the IWS is mapped to a plurality of predefined resource units (RUs).

6. The method of claim 5, wherein the plurality of RUs is one of four contiguous RUs (CRUs) and four distributed RUs (DRUs).

7. A method for performing handover by a user equipment (UE) in a wireless communication system, the method comprising:
  receiving interworking signals (IWSs) transmitted by femto base stations (BSs);
  detecting neighboring femto BSs by using a preamble included in the IWSs;
  determining whether to perform handover to any one target femto BS among the detected femto BSs;
  transmitting a handover request message to a macro BS; and
  performing handover to the target femto BS,
  wherein the IWS received from any one neighboring femto BS is mapped to a plurality of subcarriers positioned on a same orthogonal frequency division multiplexing (OFDM) symbol on a time domain,
  wherein a length of the IWS received from any one neighboring femto BS on the frequency domain is fixed regardless of bandwidth of the frequency band on which the any one neighboring femto BS operates, and
  wherein the plurality of subcarriers is subcarriers excluding the subcarriers to which pilots are mapped and subcarriers adjacent to the subcarriers to which pilots are mapped.

8. The method of claim 7, wherein the preamble includes information on a frequency band on which the femto BS operates.

9. A femto base station (BS) in a wireless communication system, the transmitter comprising:
  a radio frequency (RF) unit transmitting and receiving a radio signal; and
  a processor, coupled to the RF unit, and configured for:
  generating a preamble including information regarding a frequency band on which a femto BS operates,
  mapping an interworking signal (IWS) including the preamble to a plurality of subcarriers, the IWS informing user equipments (UEs) around the femto BS of presence of the femto BS, and
  transmitting the mapped IWS to the UEs,
  wherein the IWS is mapped to a plurality of subcarriers positioned on a same orthogonal frequency division multiplexing (OFDM) symbol on a time domain,
  wherein a length of the IWS on the frequency domain is fixed regardless of bandwidth, and
  wherein the plurality of subcarriers is subcarriers excluding the subcarriers to which pilots are mapped and subcarriers adjacent to the subcarriers to which pilots are mapped.

* * * * *